US012628718B2

(12) United States Patent
Rehnen et al.

(10) Patent No.: US 12,628,718 B2
(45) Date of Patent: May 19, 2026

(54) SEMI-MOUNTED REVERSIBLE PLOW

(71) Applicant: Amazonen-Werke H. Dreyer SE & Co. KG, Hasbergen (DE)

(72) Inventors: Pascal Rehnen, Melle (DE); Christoph Warnecke, Bad Essen (DE); Martin Wilken, Oldenburg (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 502 days.

(21) Appl. No.: 18/025,599

(22) PCT Filed: Sep. 6, 2021

(86) PCT No.: PCT/EP2021/074460
§ 371 (c)(1),
(2) Date: Mar. 9, 2023

(87) PCT Pub. No.: WO2022/053425
PCT Pub. Date: Mar. 17, 2022

(65) Prior Publication Data
US 2023/0329137 A1 Oct. 19, 2023

(30) Foreign Application Priority Data

Sep. 10, 2020 (DE) .......................... 102020123598.4
Sep. 11, 2020 (DE) .......................... 102020123706.5

(51) Int. Cl.
*A01B 3/46* (2006.01)
*A01B 15/14* (2006.01)
(52) U.S. Cl.
CPC ............ *A01B 3/464* (2013.01); *A01B 15/145* (2013.01)
(58) Field of Classification Search
CPC ..... A01B 3/464; A01B 63/004; A01B 63/245; A01B 63/32; A01B 15/145; A01B 73/00;
(Continued)

(56) References Cited

U.S. PATENT DOCUMENTS 3,698,486 A * 10/1972 Morkoski .............. A01B 3/464
172/291
4,049,063 A * 9/1977 Dietrich ............... A01B 69/003
172/647
(Continued)

FOREIGN PATENT DOCUMENTS

DE 29815053 U1 11/1998
DE 10039600 B4 1/2016
(Continued)

OTHER PUBLICATIONS

German Search Report for German Application No. DE 10 2020 123 706.5 dated May 3, 2021.
(Continued)

*Primary Examiner* — Christopher J Sebesta
*Assistant Examiner* — Blake E Scoville
(74) *Attorney, Agent, or Firm* — Potomac Law Group, PLLC; John (Jack) Penny

(57) ABSTRACT

A semi-mounted reversible plow with a headstock for attachment to a tractor, a stabilizer which is connected to the headstock and on which a plow frame carrying two rows of plow bodies is mounted by way of at least a front turning arm in a manner rotatable about a horizontal turning axis, wherein an offset rocker in a rotatable manner to the turning arm and a front furrow rocker connected in an articulated manner to the offset rocker and in a rotatable manner to the plow frame, on the other hand, are arranged between the plow frame and the turning arm, and wherein the rockers can be moved by an adjustment actuator to positions causing different transverse distances between the headstock and in the direction of travel of the foremost plow body, such that the semi-mounted reversible plow is configured to selectively assume a furrow working position and an on-land working position.

12 Claims, 4 Drawing Sheets

Figure 1:
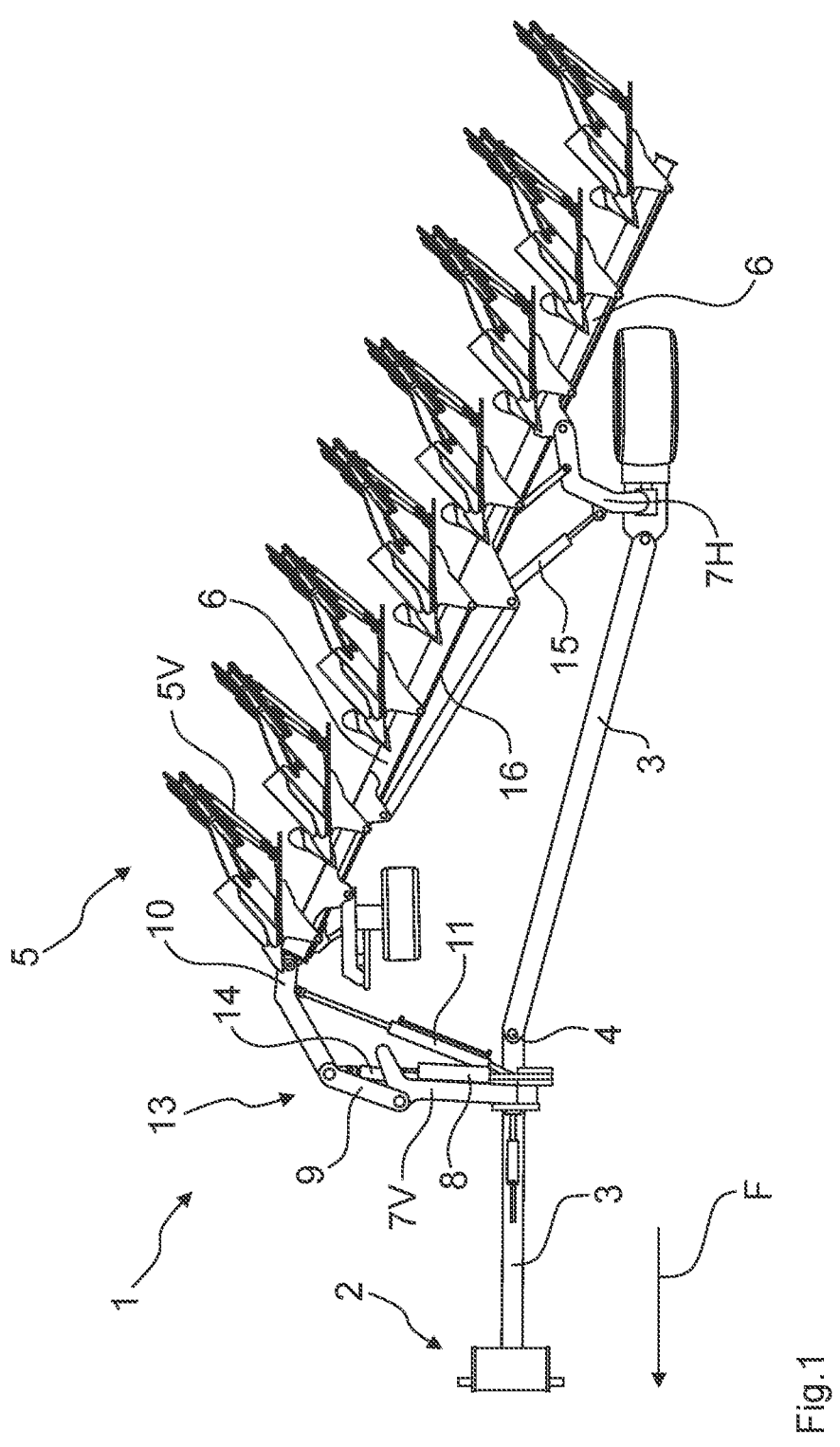

(58) Field of Classification Search
CPC .. A01B 3/60; A01B 3/40; A01B 3/466; A01B
3/62; A01B 3/56; A01B 3/54; A01B 3/44;
A01B 3/42; A01B 3/421; A01B 3/426;
A01B 3/4215; A01B 3/28; A01B 3/18
See application file for complete search history.

(56) References Cited

U.S. PATENT DOCUMENTS

| | | | | |
|---|---|---|---|---|
| 4,098,346 A | * | 7/1978 | Stanfill | A01B 3/46 |
| | | | | 172/647 |
| 4,161,986 A | * | 7/1979 | Ward | A01B 61/046 |
| | | | | 172/647 |
| 4,186,806 A | * | 2/1980 | Ward | A01B 15/145 |
| | | | | 172/647 |
| 8,813,863 B2 | * | 8/2014 | Toublanc | A01B 3/464 |
| | | | | 172/290 |
| 9,078,388 B2 | * | 7/2015 | Meurs | A01B 3/464 |
| 2013/0056234 A1 | * | 3/2013 | Meurs | A01B 3/464 |
| | | | | 172/446 |
| 2016/0120094 A1 | * | 5/2016 | Kraggerud | A01B 15/145 |
| | | | | 172/664 |

FOREIGN PATENT DOCUMENTS

| | | | | | |
|---|---|---|---|---|---|
| EP | 0173400 A1 | * | 3/1986 | | A01B 15/145 |
| EP | 1731009 A1 | * | 12/2006 | | A01B 3/4215 |
| EP | 1125489 B1 | * | 12/2007 | | A01B 3/245 |
| EP | 3698612 A1 | * | 8/2020 | | A01B 15/145 |

OTHER PUBLICATIONS

International Search Report for International Application No. PCT/
EP2021/074460 dated Jan. 4, 2022 (includes English language
translation).

* cited by examiner

SEMI-MOUNTED REVERSIBLE PLOW

The present application claims priority under 35 U.S.C. § 365 to International Application No. PCT/EP2021/074460 filed on 6 Sep. 2021, and under 35 U.S.C. § 119 to German Application Numbers DE 102020123598.4 filed 10 Sep. 2020 and DE 102020123706.5 filed 11 Sep. 2020.

BACKGROUND

The present disclosure relates to a semi-mounted reversible plow.

Such semi-mounted reversible plows which have a headstock for attachment to a tractor and can assume a furrow working position and an on-land working position are known. The headstock is there connected to a stabilizer. A plow frame, which carries two rows of plow bodies arranged opposite one another, is in turn arranged on the stabilizer in a manner rotatable about a horizontal turning axis, so that it can be turned. For this purpose, a turning arm and two rockers, an offset rocker and a front furrow rocker, are provided between the plow frame and the stabilizer. One the turning arm is attached with its one end to the stabilizer in a manner rotatable about the horizontal turning axis, and is connected with its free end to the offset rocker in a rotatable manner. The front furrow rocker is connected in an articulated manner to the offset rocker, on the one hand, and in a rotatable manner to the plow frame, on the second hand.

For moving between the furrow working position and the on-land working position and for setting various working settings, such as front furrow width or the distance between the tire edge of the tractor and the furrow edge, such semi-mounted reversible plows comprise an adjustment actuator. The offset rocker and the front furrow rocker can be moved by the adjustment actuator to positions causing different transverse distances between the headstock and in the direction of travel the foremost plow body. With previously known semi-mounted reversible plows, changing from the furrow working position to the on-land working position is complex and time-consuming, since either the adjustment actuator for the respective working position has to be attached to different points on the offset rocker or the front furrow rocker, or the position of the offset rocker relative to the front furrow rocker has to be locked manually. Furthermore, such semi-mounted reversible plows therefore have a limited range of adjustment relating to the positions of the offset rocker and front furrow rocker causing different transverse distances.

SUMMARY

The present disclosure is based on the object of creating a semi-mounted reversible plow that is improved in this respect and that can be adjusted particularly easily, and preferably by remote control, between the furrow working position and the on-land working position.

It is envisaged that the semi-mounted reversible plow comprises an offset actuator by way of which the offset rocker and the front furrow rocker can be moved to positions causing different transverse distances between the headstock and in the direction of travel the foremost plow body, regardless of the stroke position of the adjustment actuator.

Due to the fact that the offset actuator and the adjustment actuator can be actuated independently of one another, i.e. one actuator can be actuated regardless of the stroke position and/or actuation of the other actuator, the offset rocker and the front furrow rocker can be moved to positions causing larger and/or smaller transverse distances between the headstock and in the direction of travel the foremost plow body than is the case with previously known semi-mounted reversible plows. The offset actuator and adjustment actuator being operated independently entails that their adjustment ranges can be combined. As a result of this measure, the semi-mounted reversible plow therefore has an extended range of adjustment with respect to the positions of the offset rocker and front furrow rocker causing different transverse distances. Positions of the offset rocker and front furrow rocker causing transverse distances, which previously could only be obtained by relocating the adjustment actuator and/or locking the two rockers, can therefore be set remotely so that the semi-mounted reversible plow according to at least one embodiment of the invention can be moved between the furrow working position and the on-land working position in a simple and time-saving manner. It is advantageous there that, according to at least one embodiment of the invention, two actuators are now provided for adjusting the offset rocker and the front furrow rocker so that a plurality of different positions can be set.

It is provided in an advantageous further development of at least one embodiment of the invention that the offset actuator is arranged between the turning arm, in particular the end of the turning arm connected in a rotatable manner to the offset rocker, and the offset rocker, in particular the end of the offset rocker connected in an articulated manner to the front furrow rocker. The offset actuator therefore acts primarily upon the position of the offset rocker relative to the turning arm, which in turn secondarily effects the position of the front furrow rocker relative to the plow frame by way of the rotatable connection between the offset rocker and front furrow rocker. As a result of this further development, the alignment of the offset rocker relative to the stabilizer is adjustable. In particular, the transverse distance between the end of the offset rocker connected in an articulated manner to the front furrow rocker and the headstock can be adjusted.

The adjustment actuator in at least one embodiment of the semi-mounted reversible plow is arranged between the turning arm, in particular an end of the turning arm connected to the stabilizer in a manner rotatable about an axis that is horizontal in the direction of travel, and the front furrow rocker, in particular the end of the front furrow rocker connected in a rotatable manner to the plow frame. It is conceivable in an alternative embodiment that the adjustment actuator is arranged between the offset rocker, in particular the end of the offset rocker connected in an articulated manner to the front furrow rocker, and the front furrow rocker, in particular the end of the front furrow rocker connected in a rotatable manner to the plow frame. The adjustment actuator therefore acts primarily upon the position of the front furrow rocker relative to the offset rocker, which in turn secondarily causes the position of the offset rocker relative to the turning arm by way of the articulated connection between the front furrow rocker and the offset rocker. As a result of this further development, the position of the front furrow rocker relative to the plow frame is adjustable. In particular, the transverse distance between the end of the front furrow rocker connected in a rotatable manner to the plow frame and the headstock can be adjusted.

The advantage is that two independently adjustable actuators are given, by way of which the positions of offset rocker and front furrow rocker causing different transverse distances between the headstock and in the direction of travel the foremost plow body can be adjusted, where the positions can be combined, i.e. complement one another. The alignment of the plow frame relative to the stabilizer then adapts to the various settings.

The semi-mounted reversible plow according to at least one embodiment of the invention is also advantageously further developed in that the plow frame is arranged on the stabilizer in a manner rotatable about the horizontal turning axis, by way of a further, rear turning arm, in particular connected to the stabilizer in a manner rotatable about a horizontal axis at least approximately in the direction of travel, and the front turning arm. The semi-mounted reversible plow therefore has a total of two turning arms: A front turning arm, which is connected to the front end of the plow frame by way of the offset rocker and the front furrow rocker, and a rear turning arm, which is connected directly to the plow frame at the free rear end of the stabilizer.

In order to create the semi-mounted reversible plow according to at least one embodiment of the invention to be employable in a flexible manner, it is provided in a further advantageous development that the rows of plow bodies can be adjusted in their working width by way of a working width actuator. The individual plow bodies are preferably arranged to be pivotable on the plow frame and coupled to one another by an adjusting rod, so that they can be pivoted in unison by way of the working width actuator.

To create functionally reliable and robust kinematics for setting the working width, the working width actuator in a further advantageous development is arranged between the rear turning arm and the plow frame. The working width actuator is preferably arranged in the central region of the plow frame so that half of the plow body is arranged on the plow frame in the direction of travel forward of the connection of the working width actuator to the plow frame. The other half of the plow body is preferably arranged on the plow frame in the direction of travel rearward of the connection of the working width actuator to the plow frame.

It is provided in at least one embodiment of the semi-mounted reversible plow that the plow frame can be pivoted for the turning process by way of the offset actuator about a pivot axis transverse to the turning axis to a turning position with reduced transverse overhang. In the on-land working position in particular, the semi-mounted reversible plow has a large transverse overhang, so that it is advantageous to reduce the transverse overhang before actuating a turning actuator in order to improve the leverage forces acting upon the tractor, in order to minimize the risk of accidents. To shorten the turning process, in particular in a working position with a small transverse overhang, such as a furrow working position, it is alternatively conceivable that the offset actuator can be separated from the pressure medium supply for the turning process, so that a turning actuator is directly acted upon with a pressure medium. Alternatively or additionally, the adjustment actuator can be used to pivot the plow frame to reach the turning position; stop devices are preferably associated with the adjustment actuator in this case so that the adjustment actuator can be moved back to the original stroke position as prior to the turn after the turn has been completed in order to obtain the same working position of the mountable reversible plow. For moving the plow frame between its working position and the turning position, the offset actuator is preferably moved between its end positions so that the semi-mounted reversible plow can be moved back to the original working position in a simple manner after turning.

It is provided in another embodiment of the semi-mounted reversible plow according to the invention that the plow frame can be pivoted in for the turning process by way of the adjustment actuator about a pivot axis transverse to the turning axis to a turning position with a reduced transverse overhang. Alternatively or additionally, the plow frame can be pivoted in for the turning process by way of the offset actuator.

It is provided in another embodiment of the semi-mounted reversible plow according to the invention that the offset actuator and/or the adjustment actuator is connected to the pressure medium supply of at least one turning actuator such that, when pressure is applied to the turning actuator, the offset actuator and/or the adjustment actuator is first acted upon with pressure medium, preferably until an end position has been reached before the turning actuator is acted upon with pressure medium. As a result of this measure, advantageous sequence control for the offset actuator and/or the adjustment actuator and the turning actuator has been created for moving the plow frame between its working position and the turning position, which enables particularly simple and reliable operation. It is particularly advantageous there that only the turning actuator needs to be actuated for turning the plow frame, where the plow frame in this embodiment is pivoted automatically to its turning position with reduced transverse overhang before turning.

In a further advantageous development of the semi-mounted reversible plow according to at least one embodiment of the invention, a lock valve is connected upstream of the offset actuator and/or the adjustment actuator. The offset actuator and/or the adjustment actuator can then be separated from any pressure medium supply in a particularly simple manner and can therefore be held in its stroke position and/or be moved in only one direction. The lock valve is preferably configured to hydraulically lock the offset actuator and/or the adjustment actuator in at least one stroke direction. The lock valve is preferably configured as a 2/2-way valve with a one-sided check valve.

The semi-mounted reversible plow according to at least one embodiment of the invention is additionally advantageously further developed in that the semi-mounted reversible plow comprises a turning control device connected to the lock valve, in that the turning control device is configured to hold the offset actuator and/or the adjustment actuator in its stroke position by way of the lock valve when an end position has been reached and/or to release the lock valve after the plow frame has turned and to thereby act upon the offset actuator and/or the adjustment actuator with pressure medium. The end position of the offset actuator can be created by the executable stroke and/or in an adjustable manner by a stroke limitation mechanism. The offset actuator and/or the adjustment actuator is then advantageously held in its stroke position during the turn. The turning control device can comprise a cam disk interacting with an actuating element of the lock valve. The turning control device can comprise a mechanical coupling which is connected to the lock valve and converts reaching the turning position and/or the completed turn into an actuating motion of the lock valve.

It is provided in a further embodiment of the semi-mounted reversible plow according to the invention that the turning arm, in particular the front one, the offset rocker, and the front furrow rocker form a linkage gear which can be moved to positions causing different transverse distances between the headstock and in the direction of travel the foremost plow body, that the linkage gear can be moved steplessly between different end positions by way of the adjustment actuator and the offset actuator independently of one another. The linkage gear can be adjusted by one of the actuators while the other actuator can be held in its stroke position, whereby at least four different end positions for the linkage gear arise by the combination of the minimum and maximum stroke position of the offset actuator and the adjustment actuator. The offset actuator is preferably arranged in such a way that it expands upwards and downwards the interval of the transverse distances that can be set via the adjustment actuator by way of the linkage gear.

The front furrow width or the distance from the in the direction of travel foremost plow body to the furrow edge, i.e. the working width of the foremost plow body, can be adjusted by way of the adjustment actuator. The adjustment actuator can be configured to move the semi-mounted reversible plow between its furrow working position and its on-land working position.

In order to create particularly advantageous dimensioning of the adjustment actuator and the offset actuator, it is provided that the executable stroke of the adjustment actuator is twice, preferably three times, particularly preferably four times as large as the executable stroke of the offset actuator. As a result of this further development, the adjustment actuator is specially configured to move the semimounted reversible plow between its furrow working position and its on-land working position. As a result of this further development, the offset actuator is specially configured to add a further offset to the furrow working position and its on-land working position with.

The semi-mounted reversible plow according to the invention is also advantageously further developed in that the transverse distance between the headstock and in the direction of travel the front plow body can be adjusted to at least 1.5 meters, preferably a maximum of approximately 2 meters, by way of different positions of the offset rocker and the front furrow rocker, in particular the linkage gear. As a result of this further development, the semi-mounted reversible plow can be used in the on-land working position with tractors having an external width of up to 4 meters. Due to extreme weather conditions, the use of twin tires on the tractor is recommended for some work assignments, where the semi-mounted reversible plow is suitable also for such work assignments as a result of this further development. Alternatively or additionally, the transverse distance, especially in the furrow working position, between the headstock and in the direction of travel the foremost plow body can be adjusted to at least 0.6 meters by way of different positions of the offset rocker and the front furrow rocker, in particular the linkage gear.

In order to improve the kinematics for the turning process in a simple manner, the offset actuator in a further advantageous development, in particular in the on-land working position, is associated with a stroke limitation mechanism which limits the adjustment range preferably to half of the executable stroke. The stroke limitation mechanism can be configured as clips that can be slipped onto the piston rod of the offset actuator so that they form a variably adjustable stop for a shortened end position of the offset actuator.

It is provided in a further advantageous development of the semi-mounted reversible plow according to the invention that the stabilizer has a constant length. The stabilizer is therefore configured to be particularly robust. The stabilizer can alternatively or additionally be foldable to allow the plow frame to follow the positions of the offset rocker and the front furrow rocker.

The semi-mounted reversible plow according to the invention is also advantageously further developed in that the adjustment actuator is configured as a memory cylinder and has a memory piston which divides a pressure medium chamber of the adjustment actuator into two separate pressure medium chambers and is in particular configured to form an internal stop for a piston connected to a piston rod of the adjustment actuator. The semi-mounted reversible plow is then configured by way of the memory cylinder to "store" a stroke position of the adjustment actuator and to move back to this position after retracting when extending. The memory cylinder can preferably be moved in the desired stroke position against the piston of the adjustment actuator, where at least the pressure medium chamber of the separate pressure medium chambers facing away from the piston is subsequently blocked, preferably hydraulically, so that the memory cylinder is held in its stroke position relative to the piston. The piston of the adjustment actuator can be retracted by applying pressure medium to the pressure medium chamber of the two separate pressure medium chambers facing the piston. The piston of the adjustment actuator can be extended by applying pressure medium to the piston side, where the memory cylinder forms an internal stop for the extension motion of the piston, since it can be held in its stroke position. This embodiment can advantageously be combined with the further development for moving the plow frame to a turning position by way of the adjustment actuator in that the memory cylinder can be used to facilitate the return to assume the original working position by way of the adjustment actuator in that it forms an internal stop for the piston of the adjustment actuator in the working position.

In order to further develop the semi-mounted reversible plow according to the invention in an advantageous manner, the adjustment actuator is associated with a preferably hydraulic damping element, where the adjustment actuator is able to be held resiliently in its stroke position against the damping element, preferably by way of a stopcock, in particular when the semi-mounted reversible plow is in the transport position. In the half-turned transport position of the semi-mounted reversible plow, so that the rows of plow bodies point upwards, the plow frame can be supported on the adjustment actuator, where this support is damped in an advantageous manner as a result of this further development. As a result of this measure, impacts caused by bumps in the ground introduced into the semi-mounted reversible plow by way of a support wheel for transport travel or impassable terrain are absorbed at least in part.

Figure 2:
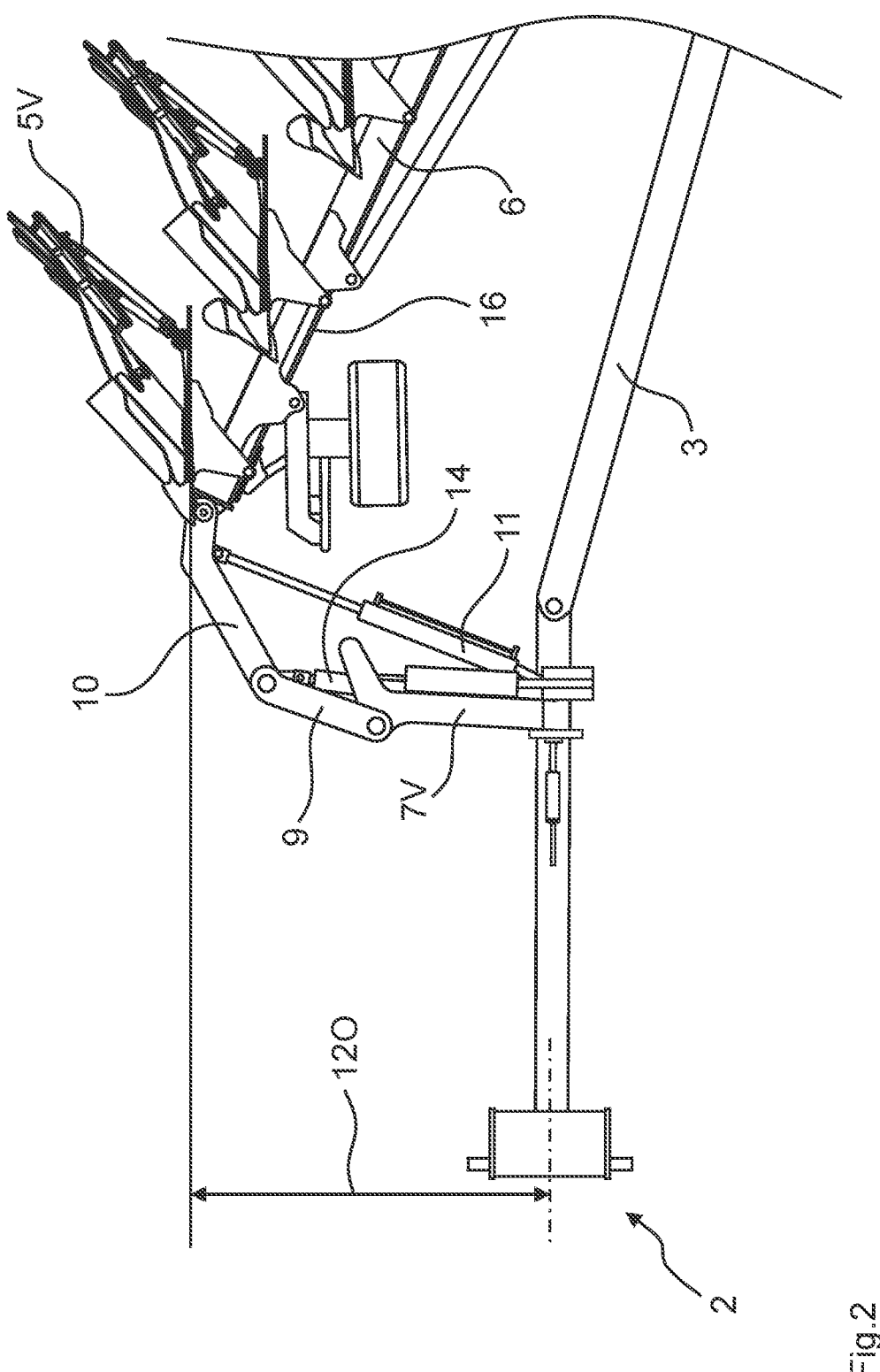
Figure 3:
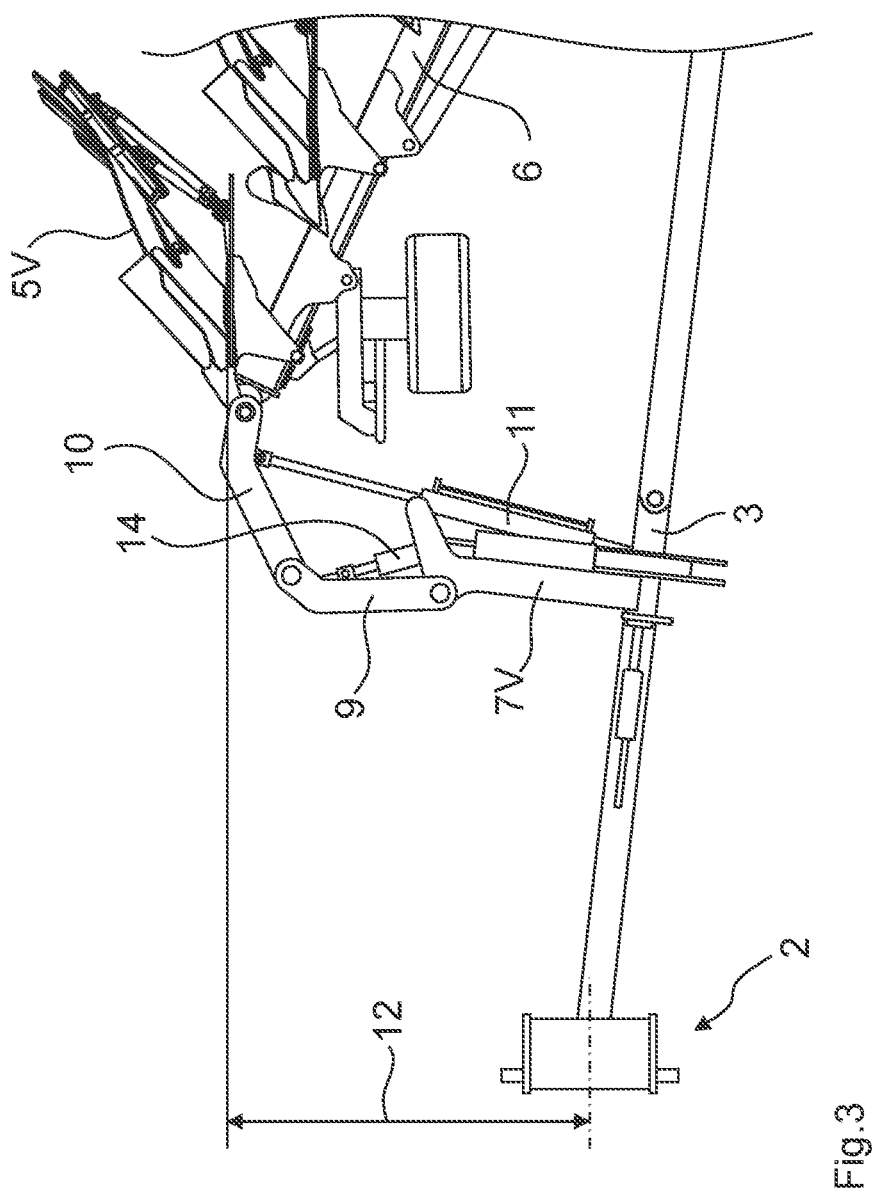
Figure 4:
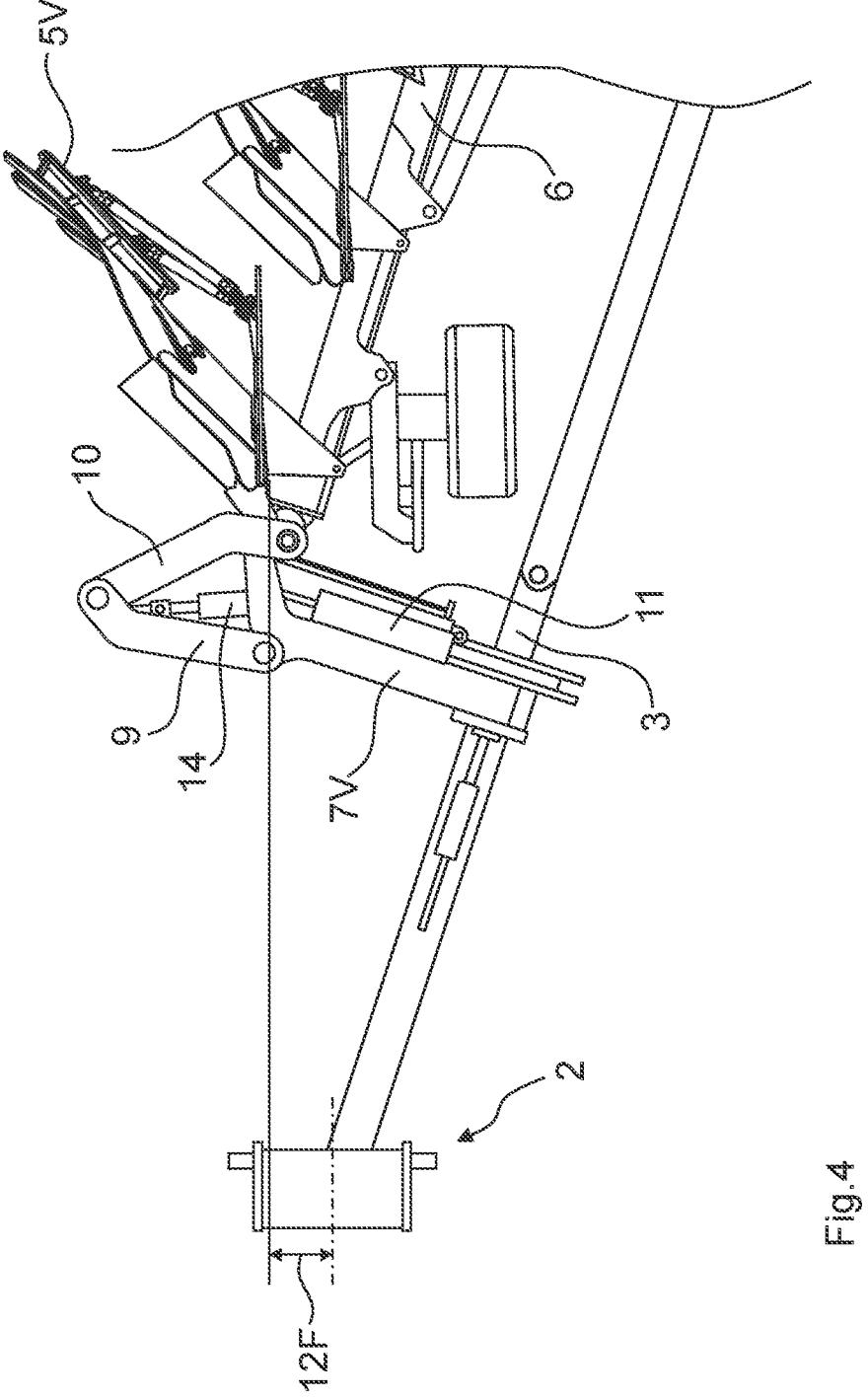

Further details of the invention can be gathered from the description of the examples and the drawings, where the drawing in FIG. 1 shows a semi-mounted reversible plow according to the invention in an on-land working position in a schematic top view, FIG. 2 shows the semi-mounted reversible plow according to FIG. 1 in a detailed top view, FIG. 3 shows the semi-mounted reversible plow similar to FIG. 1, 2 in a second on-land working position in a detailed top view, and FIG. 4 shows the semi-mounted reversible plow in the furrow working position in a detailed top view.

A semi-mounted reversible plow 1 according to the invention with a headstock 2 for attachment to a tractor, not shown, can be seen in FIG. 1. A two-part stabilizer 3 extends in direction of travel F rearward from headstock 2. The two parts of stabilizer 3 are connected in a rotatable manner by way of an articulation 4 with an at least approximately vertical articulation axis so that stabilizer 3 can be folded transverse to direction of travel F. Stabilizer 3 has a constant length and is therefore non-telescopic or otherwise adjustable in length.

A plow frame 6 carrying two oppositely disposed rows of plow bodies 5 is arranged via a front turning arm 7V and a rear turning arm 7H on stabilizer 3 in a manner rotatable about a horizontal turning axis. Rear turning arm 7H is connected to the stabilizer in a manner rotatable about an axis that is horizontal at least approximately in direction of travel F. Semi-mounted reversible plow 1 comprises a turning actuator 8 for turning plow frame 6 from the working side on the right shown in FIG. 1 about the horizontal turning axis to the opposite working side.

In order to be able to use semi-mounted reversible plow 1 selectively in the on-land working position shown or in a furrow working position shown in FIG. 4, an offset rocker 9 connected in a rotatable manner to turning arm 7V and a front furrow rocker 10 connected in an articulated manner to offset rocker 9, on the one hand, and to plow frame 6 in a rotatable manner, on the other hand, are arranged between plow frame 6 and front turning arm 7V Offset rocker 9 and front furrow rocker 10 can be moved by an adjustment actuator 11 to positions causing different transverse distances 12, 12O, 12F between headstock 2 and in direction of travel F foremost plow body 5V. Semi-mounted reversible plow 1 can be moved between the on-land working position and the furrow working position with the aid of adjustment actuator 11 by way of offset rocker 9 and front furrow rocker 10, which together with turning arm 7V can also be referred to as linkage gear 13.

As can be seen in FIG. 1, semi-mounted reversible plow 1 comprises an offset actuator 14 by way of which offset rocker 9 and front furrow rocker 10 can be moved to positions causing different transverse distances 12, 12O, 12F between headstock 2 and in direction of travel F foremost plow body 5V, regardless of the stroke position of adjustment actuator 11. Offset actuator 14 is arranged between the end of turning arm 7V, which is connected in a rotatable manner to offset rocker 9, and offset rocker 9, namely the end of offset rocker 9, which is connected in an articulated manner to front furrow rocker 10. As is evident from the synopsis of FIGS. 2 and 3, offset actuator 14 therefore acts primarily upon the position of offset rocker 9 relative to turning arm 7V, which in turn secondarily causes the position of front furrow rocker 10 relative to plow frame 6 by way of the articulated connection between offset rocker 9 and front furrow rocker 10.

In FIG. 2, offset rocker 9 and front furrow rocker 10 are shown in the position causing maximum transverse distance 12O. Transverse distance 12O between headstock 2 and in direction of travel F foremost plow body 5V is set to at least approximately 2 meters there. In this position, adjustment actuator 11 is extended to the maximum and offset actuator 14 is retracted. Adjustment actuator 11 pushes the point at which front furrow rocker 10 is connected in a rotatable manner to plow frame 6 by way of its stroke to the outside. In addition, offset actuator 14 pushes front furrow rocker 10 even further outwards by pulling offset rocker 9 in, as becomes clear from the synopsis of FIGS. 2 and 3. In FIG. 3, offset rocker 9 and front furrow rocker 10 are shown in a position causing a reduced transverse distance 12, which can be adjusted by extending offset actuator 14 with adjustment actuator 11 at its maximum stroke.

Adjustment actuator 11 is arranged between the end of turning arm 7V connected to stabilizer 3 in a manner rotatable about the axis that in direction of travel F is horizontal, and the end of front furrow rocker 10 connected to plow frame 6 in a rotatable manner. Adjustment actuator 11 therefore acts primarily upon the position of front furrow rocker 10 relative to offset rocker 9, which in turn secondarily causes the position of offset rocker 9 relative to turning arm 7V by way of the articulated connection between front furrow rocker 10 and offset rocker 9. The front furrow width or the distance of plow body 5V from the furrow, respectively, can consequently be adjusted primarily by the stroke position of adjustment actuator 11 and, if necessary, additionally increased and/or reduced with the aid of offset actuator 14.

In FIG. 4, offset rocker 9 and front furrow rocker 10 are shown in the position causing minimum transverse distance 12F, where semi-mounted reversible plow 1 is in a furrow working position. Transverse distance 12F between headstock 2 and in direction of travel F foremost plow body 5V is set to at least approximately 0.6 meters there. In this position, adjustment actuator 11 is retracted into its minimum stroke position and offset actuator 14 is extended. This furrow working position preferably corresponds to the transport position of semi-mounted reversible plow 1.

Front turning arm 7V, offset rocker 9, and front furrow rocker 10 therefore form a linkage gear 13 which can be moved to different transverse distances 12, 12O, 12F between headstock 2 and in direction of travel F foremost plow body 5V, where linkage gear 13 can be moved by adjustment actuator 11 and offset actuator 14 independently of one another in a stepless manner between the various end positions shown in FIGS. 2, 3 and 4. The executable stroke of adjustment actuator 11 is at least four times the executable stroke of offset actuator 14.

Rows of plow bodies 5 are also adjustable in their working width by way of a working width actuator 15 which is arranged between rear turning arm 7H and plow frame 6. The individual plow bodies are received to be pivotable on plow frame 6 and coupled to one another by a coupling bar 16 so that they can be pivoted in unison in an adjustable manner by way of working width actuator 5.

Since semi-mounted reversible plow 1 projects out far transverse to direction of travel F, in particular in the on-land working position shown in FIG. 2, plow frame 6 can be pivoted for the turning process by way of offset actuator 14 about a pivot axis transverse to the turning axis to a turning position with reduced transverse projection, as shown in FIG. 3. For this purpose, offset actuator 14 is connected to the pressure medium supply of turning actuator 8 such that when pressure is applied to the turning actuator 8, offset actuator 14 is first acted upon with pressure medium until it reaches its end position, before turning actuator 8 is first acted upon with pressure medium in order to turn plow frame 6 with the aid of turning arms 7V, 7H to its opposite working side. Sequence control of offset actuator 14 and turning actuator 8 has thus been created, which pivots plow frame 6 in first before each turn.

Offset actuator 14 has an upstream lock valve (not shown), the actuation of which holds offset actuator 14 in its stroke position. Alternatively or additionally, adjustment actuator 11 has an upstream lock valve. In order to pivot plow frame 6 back to the original working position after the turn has been completed, it is provided that semi-mounted reversible plow 1 comprises a turning control device connected to the lock valve The turning control device is configured to hold offset actuator 14 in its stroke position by way of the lock valve when an end position has been reached and to release the lock valve after plow frame 6 has been turned and to act upon offset actuator 14 with pressure medium. Alternatively or additionally, the turning control device can be configured to hold adjustment actuator 11 in its stroke position in a projecting manner or to act upon it with pressure medium, respectively. A stroke limitation mechanism in the form of clips fitted onto the piston rod can be associated with offset actuator 14 in order to limit the adjustment range, for example, to half of the executable stroke. In this case, the end position has been reached after half the stroke of offset actuator 14, whereupon the turning position has been reached.

The turning process is therefore performed according to the following motion pattern: When the turning process is initiated, for example, from the on-land working position shown in FIG. 2, by acting upon turning actuator 8 with pressure medium, plow frame 6 is first pivoted in to a turning position by way of offset actuator 14. Alternatively or additionally, it is conceivable that plow frame 6 is pivoted to the turning position by way of adjustment actuator 11. By connecting offset actuator 14 and/or adjustment actuator 11 to the pressure medium supply of turning actuator 8, turning actuator 8 is acted upon with pressure medium when the turning position shown in FIG. 3 has been reached so that plow frame 6 is turned by 180 degrees. Offset actuator 14 and/or adjustment actuator 11 is there held in its stroke position by way of the lock valve actuated by the turning control device. After the turn, the lock valve is released by the turning control device so that offset actuator 14 and/or adjustment actuator 11 is again acted upon with pressure medium and plow frame 6 is pivoted out to its original working position according to FIG. 2.

In an embodiment that is not shown, adjustment actuator 11 is configured as a memory cylinder and has a memory piston, which divides a pressure medium chamber, namely the annular chamber of adjustment actuator 11 into two separate pressure medium chambers. The memory piston can be provided to form an internal stop for a piston connected to a piston rod of adjustment actuator 11. This is particularly advantageous when adjustment actuator 11 is retracted when turning for plow frame 6 to assume a turning position with a reduced transverse overhang, since the original working position can be reliably assumed again when extending again after the turn in that the piston is moved against the internal stop formed by the memory piston. For this purpose, the memory piston can be moved relative to the piston of adjustment actuator 11 by way of a suitable device according to the desired working position and can be held in its stroke position.

Furthermore, in a further embodiment that is not shown, adjustment actuator 11 can be associated with a hydraulic damping element in the form of a hydraulic accumulator. In the transport position, adjustment actuator 11 can be held resiliently in its stroke position against the hydraulic accumulator so that shocks during transport travel can be absorbed. A stopcock can be associated with adjustment actuator 11 in order to hold adjustment actuator 11 resiliently in its stroke position against the hydraulic accumulator.

LIST OF REFERENCE CHARACTERS 1 semi-mounted reversible plow
2 headstock
3 stabilizer
F direction of travel
4 articulation
row of plow bodies
5V (foremost) plow body
6 plow frame
7V, 7H turning arm
8 turning actuator
9 offset rocker
10 front furrow rocker 11 adjustment actuator
12, 12O, 12F transverse distance
13 linkage gear
14 offset actuator
15 working width actuator
16 coupling bar

The invention claimed is:

1. A semi-mounted reversible plow comprising:
a headstock for attachment to a tractor;
a stabilizer which is connected to said headstock and on which a plow frame carrying two rows of plow bodies is mounted by way of at least a front turning arm in a manner rotatable about a horizontal turning axis, wherein an offset rocker connected in a rotatable manner to said turning arm and a front furrow rocker (connected in an articulated manner to said offset rocker and in a rotatable manner to said plow frame, are arranged between said plow frame and said turning arm, and wherein the rockers are movable by an adjustment actuator to positions causing different transverse distances between said headstock and in the direction of travel of the foremost plow body, such that said semi-mounted reversible plow is configured to selectively assume a furrow working position and an on-land working position; and
an offset actuator by way of which said offset rocker and said front furrow rocker are movable to positions causing different transverse distances between said headstock and in the direction of travel of said foremost plow body, regardless of the stroke position of said adjustment actuator;
wherein said plow frame is pivotable for turning by way of said offset actuator about a pivot axis transverse to the turning axis to a turning position with reduced transverse overhang;
wherein said offset actuator, in the on-land working position, is associated with a stroke limitation mechanism.

2. The semi-mounted reversible plow according to claim 1, wherein said offset actuator is arranged between the end of said turning arm connected in a rotatable manner to said offset rocker, and the end of said offset rocker is connected in an articulated manner to said front furrow rocker.

3. The semi-mounted reversible plow according to claim 1, wherein said adjustment actuator is arranged between an end of said turning arm connected to said stabilizer in a manner rotatable about an axis that is horizontal in the direction of travel, and the end of said front furrow rocker connected in a rotatable manner to said plow frame.

4. The semi-mounted reversible plow according to claim 1, wherein said plow frame is arranged on said stabilizer in a manner rotatable about the horizontal turning axis by way of a rear turning arm, connected to said stabilizer in a manner rotatable about a horizontal axis at least approximately in the direction of travel, and said front turning arm.

5. The semi-mounted reversible plow according to claim 1, wherein said rows of plow bodies are adjustable in their working width by way of a working width actuator.

6. The semi-mounted reversible plow according to claim 5, wherein said working width actuator is arranged between said rear turning arm and said plow frame.

7. The semi-mounted reversible plow according to claim 1, wherein said plow frame is pivotable for turning by way of said adjustment actuator about a pivot axis transverse to the turning axis to a turning position with reduced transverse overhang.

8. The semi-mounted reversible plow according to claim 1, wherein said offset actuator and/or said adjustment actuator is connected to a pressure medium supply of at least one turning actuator such that, when pressure is applied to said turning actuator, said offset actuator and/or said adjustment actuator is first acted upon with pressure medium until an end position has been reached, before said turning actuator is acted upon with pressure medium.

9. The semi-mounted reversible plow according to claim 1, wherein said offset actuator and/or said adjustment actuator has an upstream lock valve.

10. The semi-mounted reversible plow according to claim 9, wherein said semi-mounted reversible plow comprises a turning control device connected to said lock valve, said turning control device is configured to hold said offset actuator and/or said adjustment actuator in its stroke position by way of said lock valve when an end position has been reached and/or to release said lock valve after said plow frame has turned and to thereby act upon said offset actuator and/or said adjustment actuator with said pressure medium.

11. The semi-mounted reversible plow according to claim 1, wherein said front turning arm, said offset rocker, and said front furrow rocker form a linkage gear that is movable to positions causing different transverse distances between said headstock and in the direction of travel said foremost plow body, in that said linkage gear is movable steplessly between different end positions by way of said adjustment actuator and said offset actuator independently of one another.

12. The semi-mounted reversible plow according to claim 1, wherein said stroke limitation mechanism limits the setting range of said offset actuator to half of the executable stroke.

* * * * *